United States Patent
Terashima (10) Patent No.: US 8,345,347 B2
(45) Date of Patent: Jan. 1, 2013

(54) ELECTROPHORETIC DISPLAY DEVICE AND ELECTRONIC DEVICE

(75) Inventor: Yasuhiro Terashima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 71 days.

(21) Appl. No.: 13/085,763

(22) Filed: Apr. 13, 2011

(65) Prior Publication Data

US 2011/0255144 A1   Oct. 20, 2011

(30) Foreign Application Priority Data

Apr. 20, 2010  (JP) ................................. 2010-096922

(51) Int. Cl.
*G02B 26/00* (2006.01)
*G09G 3/34* (2006.01)

(52) U.S. Cl. ....................................... 359/296; 345/107
(58) Field of Classification Search .................. 359/296; 345/107; 430/32; 204/600
See application file for complete search history.

(56) References Cited

U.S. PATENT DOCUMENTS 7,408,697 B2 * 8/2008 Kawai ........................... 359/296
2009/0231676 A1   9/2009 Uchida

FOREIGN PATENT DOCUMENTS

JP   A-2009-222902   10/2009

* cited by examiner

*Primary Examiner* — William Choi
(74) *Attorney, Agent, or Firm* — Oliff & Berridge, PLC (57) ABSTRACT

Provided is an electrophoretic display device that includes a display region including an electrophoretic element interposed between a first substrate and a second substrate that is flexible; and a conductive member that is located between the first substrate and the second substrate and at a position outside the display region and that electrically connects the substrates, the conductive member having a different thickness from that of the electrophoretic element; wherein the second substrate includes a slit formed at a position between the display region and the conductive member.

14 Claims, 6 Drawing Sheets

ELECTROPHORETIC DISPLAY DEVICE AND ELECTRONIC DEVICE

CROSS-REFERENCE TO RELATED APPLICATION

This application is based on and claims priority from Japanese Patent Application No. 2010-096922, filed on Apr. 20, 2010, the contents of which are incorporated herein by reference.

BACKGROUND

1. Technical Field

The present invention relates to an electrophoretic display device and an electronic device.

2. Related Art

Display devices such as liquid crystal devices have come to be widely employed in mobile phones, TV sets, watches, and so forth, and are advancing in terms of functions and performances. In particular, rapid developments are being made for achieving reductions in frame width, thickness, and weight, in response to demands for better design and functions from users. The demand for thinner devices is urging development of paper-like display devices that can be bent or folded, such as flexible display devices, as an advanced form of flat display devices. An example of such flexible display devices, which can be made thinner and lighter because they have a similar nature to paper, is an electrophoretic display (EPD) device.

An EPD device includes a microcapsule layer serving as a display layer interposed between a driving substrate on a lower side and a transparent electrode film on an upper side, and hence reliability in terms of mechanical and electrical connection of electrical connection points between the driving substrate and the transparent electrode film is a key issue. Accordingly, for example as disclosed in JP-A-2009-222902, a conductive material is provided for electrical connection between the driving substrate and the transparent electrode film, with the capsule layer interposed therebetween.

The foregoing connection arrangement between the upper and lower substrates has, however, a drawback in that the conductive material of the electrical connection point may become separated from the upper or lower electrode in the case where the conductive material is thinner than the display layer between the upper and lower electrodes, resulting in significant degradation of reliability in terms of mechanical and electrical connection.

On the other hand, in the case where the conductive material is thicker than the display layer between the upper and lower electrodes and, for example, where the conductive material is located close to the display layer, the display layer may become separated from the upper or lower electrode layer because of the difference in thickness between the conductive material and the display layer, which leads to defective display performance. This could be avoided by providing the conductive material at a position sufficiently distant from the display region thereby mitigating steep inclination of the transparent electrode film arising from the difference in thickness between the conductive material and the display layer, however such an arrangement is not realistic because a large space would be required around the display region.

SUMMARY

An advantage of some aspects of the invention is that an electrophoretic display device and an electronic device are provided that can suppress a malfunction arising from a difference in thickness between a conductive material and a display layer.

An aspect of the invention provides an electrophoretic display device that includes a display region including an electrophoretic element interposed between a first substrate and a second substrate that is flexible, and a conductive member that is located between the first substrate and the second substrate and at a position outside the display region, and that electrically connects the substrates, the conductive member having a different thickness from that of the electrophoretic element, wherein the second substrate includes a slit formed at a position between the display region and the conductive member.

In the electrophoretic display device thus configured, the slit provided between the display region and the conductive member allows a portion of the second substrate corresponding to the display region and a portion thereof corresponding to the conductive member to be flexibly deformed independently. Accordingly, the slit prevents the second substrate from being steeply inclined in the region between the display region and the conductive member, even though the electrophoretic element and the conductive member are different in thickness. The slit also contributes to reducing a load imposed on a joint portion between the second substrate and the conductive member or the electrophoretic element, thereby improving adhesion between the first substrate and the second substrate, which leads to achieving a mounted structure that is highly reliable in terms of mechanical and electrical connection. Such a configuration allows the conductive member to be located relatively close to the display region, thereby facilitating a region around the conductive member to be formed as a narrow frame, and increasing a degree of freedom in designing. Consequently, a highly reliable device that can suppress a malfunction arising from a difference in thickness between the electrophoretic element and the conductive member can be obtained.

Preferably, the conductive member may be thicker than the electrophoretic element in the foregoing electrophoretic display device.

Making the conductive member thicker leads to increased adhesion thereof, thereby facilitating a footprint of the conductive member to be made smaller. Consequently, a narrow-framed structure that provides higher freedom in designing with respect to a region around the conductive member can be obtained.

Preferably, the first substrate may also be constituted of a flexible material.

Such a structure contributes to increasing flexibility of the display device, since the first substrate is also flexible.

Preferably, the slit may be formed in the second substrate with closed ends.

In this case, since the slit in the second substrate is closed at the respective ends, mechanical strength of the second substrate can be increased.

Preferably, the slit may include a widened portion which is wider than the remaining portion, at least at an end portion of the slit.

Such a configuration prevents stress from concentrating at the end portion of the slit, thereby preventing the end portion of the slit from extending further.

Preferably, the slit may be formed so as to extend along a side of the conductive member facing the display region.

Such a configuration prevents, because of the slit being located along the display region, a region between the display region and the conductive member from being formed in a steep shape.

Preferably, at least an end portion of the slit may extend as far as a region outside the conductive member, in a longitudinal direction of the slit.

Such a configuration results in formation of a sloped portion, where the end portion of the slit located outside the conductive member mitigates a difference in thickness between the conductive member and the electrophoretic element in the longitudinal direction of the slit. Accordingly, for example, an interconnect arranged along the sloped portion for connection to the conductive member can be prevented from being disconnected.

Another aspect of the invention provides an electronic device including the foregoing electrophoretic display device.

The electronic device thus constituted includes a display device with a narrowed frame and higher reliability in terms of mechanical and electrical connection, and therefore provides higher performance with increased reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, embodiments of the invention will be described with reference to the drawings. In the drawings referred to hereunder, different scales are adopted for constituent elements as the case may be, for better visual recognition.

Figure 1:
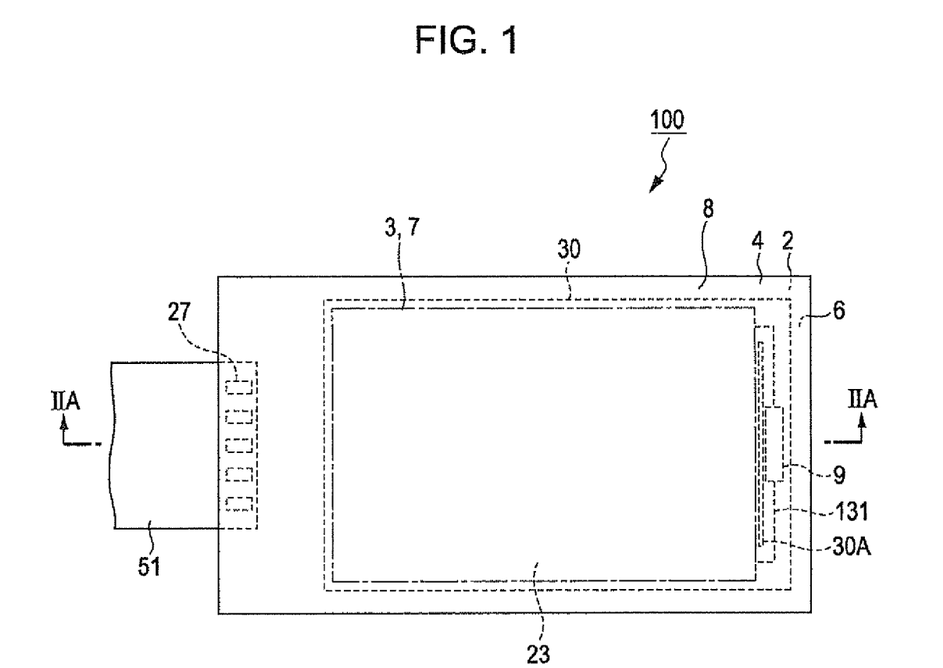
FIG. 1 is a plan view showing a general configuration of an electrophoretic display device.
Figure 2A:
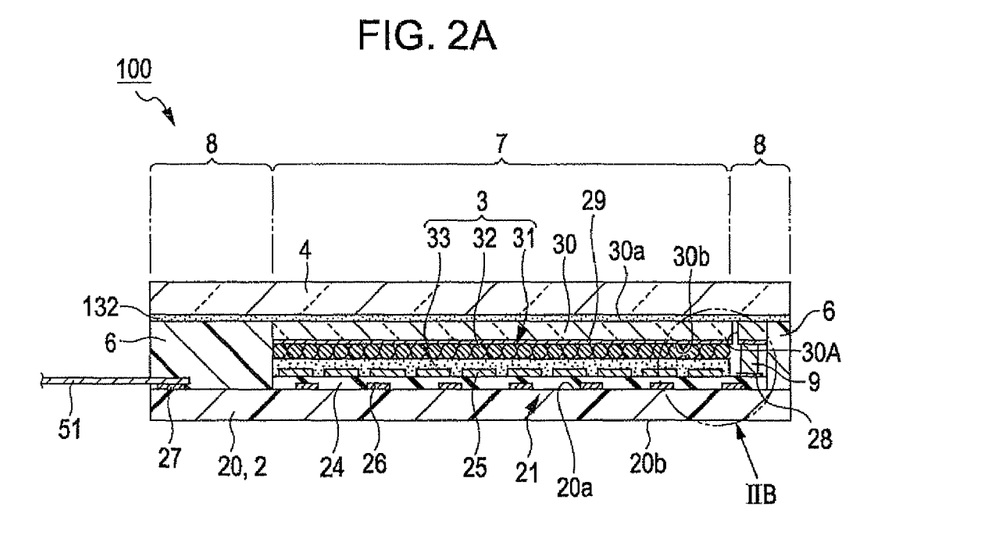
FIG. 2A is a cross-sectional view of the electrophoretic display device taken along a line IIA-IIA in FIG. 1.

FIG. 1 is a plan view showing a general configuration of an electrophoretic display device according to the invention. FIG. 2A is a cross-sectional view of the electrophoretic display device taken along a line IIA-IIA in FIG. 1, and FIG. 2B is an enlarged view of a circled portion in FIG. 2A.

Figure 2B:
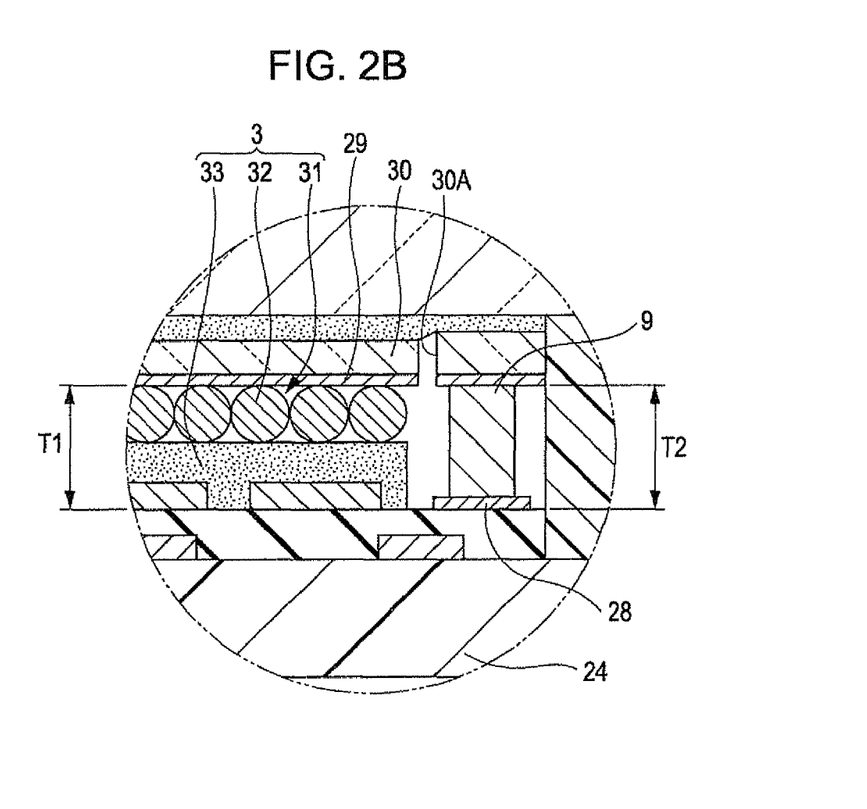
FIG. 2B is an enlarged view of a circled portion in FIG. 2A.

As shown in FIGS. 1, 2A and 2B, the electrophoretic display device 100 includes an element substrate 2 exemplifying the first substrate of the invention, a transparent substrate 30 exemplifying the second substrate, an electrophoretic element 3 interposed between the substrates 2 and 30, a glass substrate 4, and a seal member 6.

The electrophoretic display device 100 includes a display region 7 where pixel electrodes 25 are aligned in rows in plan view. In the display region 7, regions where the individual pixel electrodes 25 are located in plan view constitute pixel regions, which respectively display a still image or a moving image. A non-display region 8, where images are not displayed, is provided around the display region 7.

The element substrate 2 includes a base material 20, a driver layer 21 and terminals 27. The base material 20 is a plate-shaped material of, for example, approx. 30 μm to 100 μm in thickness. Examples of the material of the base material 20 include inorganic substrates such as a glass substrate, a quartz substrate, a silicon substrate, and a gallium-arsenic substrate, and plastic substrates (resin substrates) constituted of polyimide, polyethylene terephthalate (PET), polyethylene naphthalate (PEN), polymethyl methacrylate (PMMA), polycarbonate (PC), polyether sulfone (PES), aromatic polyester (liquid crystal polymer), and the like.

The driver layer 21 is provided on an inner surface 20a of the base material 20, in a region overlapping the electrophoretic element 3 in plan view. The location of the driver layer 21 in plan view generally matches that of the display region 7, and driver circuit elements (not shown) are provided in a region peripheral to the driver layer 21 (non-display region 8). The driver circuit elements are electrically connected to data lines and scanning lines, for providing signals to the driver layer 21.

The driver layer 21 includes an insulating layer 24, a plurality of pixel electrodes 25 and a plurality of switching elements 26. The pixel electrodes 25 are arrayed, for example, in a matrix pattern in plan view. The switching elements 26 each accompany the respective pixel electrodes 25. The switching elements 26 are connected to the data lines and scanning lines, which are not shown. The insulating layer 24 is provided over the base material 20 so as to cover the foregoing constituents.

The terminals 27 are provided on the inner surface 20a of the base material 20, in a region outside the electrophoretic element 3 (display region 7) in plan view. The terminals 27 are arrayed along a side of the element substrate 2. The terminals 27 are connected to interconnects, which are not shown. The interconnects are connected, for example, to the scanning lines and data lines. The terminals 27 are also connected to a flexible substrate 51 for electrical connection to an external device. Also, a terminal (not shown) for connection to each terminal 27 is provided on the flexible substrate 51 for external connection, at the respective connection point therebetween.

The transparent substrate 30 is a light-transmissive sheet retaining the electrophoretic elements 3, and has a thickness of approx. 25 μm to 200 μm (in this embodiment, 125 μm). The transparent substrate 30 may be constituted of a highly light-transmissive material such as PET, PES, and PC. For example, a moisture-proof sheet (not shown) may be provided on an outer surface 30a of the transparent substrate 30.

A common electrode 29, constituted of a conductive material having high light-transmittance such as ITO, is provided generally over the entirety of an inner surface 30b of the transparent substrate 30. The common electrode 29 is electrically connected to the element substrate 2 through a vertical conduction member 9, exemplifying the conductive member of the invention. The vertical conduction member 9 is formed, for example, so as to be electrically connected to a connection terminal 28 provided on the surface of the element substrate 2. The connection terminal 28 is a constituent included in the element substrate 2. The vertical conduction member 9 may be constituted, for example, of an anisotropic conductive film or sheet. As shown in FIGS. 1, 2A and 2B, the vertical conduction member 9 is located in the non-display region 8, along one of peripheral sides of the display region 7. Here, the connection terminal 28 may be located on the insulating layer 24 for example, instead of the structure shown in FIGS. 2A and 2B.

In this embodiment, a thickness T2 of the vertical conduction member 9 is greater than a thickness T1 of the electrophoretic element 3, as shown in FIG. 2B. In the electrophoretic display device 100, accordingly, a clearance between the transparent substrate 30 and the element substrate 2 is larger in a part of the non-display region 8 where the vertical conduction member 9 is provided, than in a region corresponding to the display region 7.

In the case where the vertical conduction member 9 is thicker than the electrophoretic element 3, the electrophoretic element 3 interposed between the element substrate 2 and the transparent substrate 30 may be subjected to a load, so that a joint portion of the electrophoretic element 3 may be separated from the respective substrates.

However, the electrophoretic display device 100 according to this embodiment includes a slit 30A formed in the transparent substrate 30 at a position between the vertical conduction member 9 and the display region 7, as shown in FIGS. 2A and 2B. It is to be noted here that the slit according to the invention includes not only one formed by cutting away a portion of the transparent substrate 30, but also one formed by cutting the transparent substrate 30 halfway in a thickness-wise direction thereof.

The slit 30A thus formed prevents formation of a steep shape in the region between the vertical conduction member 9 and the display region 7, as will be subsequently described in further detail.

The glass substrate 4 is provided over the outer surface 30a of the transparent substrate 30 with an adhesive layer 132 therebetween as shown in FIG. 2A, and is larger in size in plan view than the transparent substrate 30 and the element substrate 2. Since the presence of the slit 30A causes a portion of the transparent substrate 30 corresponding to the vertical conduction member 9 to protrude upward, a stepped portion is created on the outer surface 30a of the transparent substrate 30. The adhesive layer 132 serves to planarize the stepped portion originating from the slit 30A, as well as to securely bond the glass substrate 4 to the outer surface 30a of the transparent substrate 30.

In this embodiment, it is preferable to employ a material that has high light-transmittance and planarity, and is scratch-resistant, as the glass substrate 4. Specific examples of such materials include inorganic glass, crystal glass, sapphire glass, and acrylic glass. The glass substrate 4 covers the electrophoretic layer 31 together with the element substrate 2 and the transparent substrate 30, and such a structure further ensures prevention of moisture intrusion into the electrophoretic layer 31.

The seal member 6, which serves to encapsulate the electrophoretic layer 31, is disposed between a respective periphery of the element substrate 2 and the glass substrate 4, so as to surround a periphery of the electrophoretic layer 31. The seal member 6 may be constituted of a resin material, such as an epoxy resin.

Here, the slit 30A is formed with both ends thereof closed, in the transparent substrate 30. Such a configuration incurs less compromise in mechanical strength of the transparent substrate 30, compared with the case where either end portion of the slit 30A is open at an edge of the transparent substrate 30.

Figure 3:
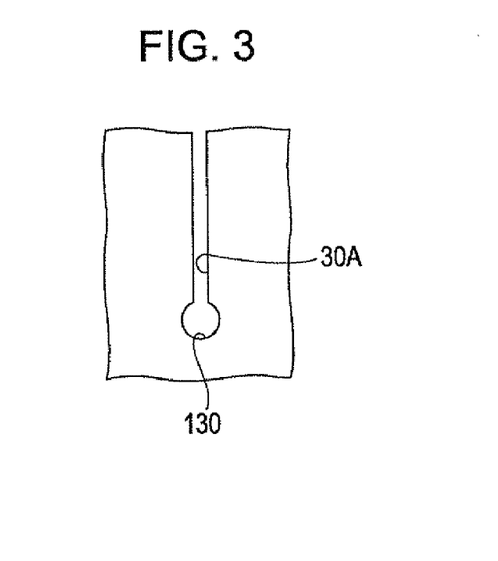
FIG. 3 is an enlarged drawing showing an end portion of a slit.

FIG. 3 is an enlarged drawing showing an end portion of the slit 30A formed in the transparent substrate 30, in a state before the transparent substrate 30 is bonded to the element substrate 2. As shown therein, the end portion of the slit 30A according to this embodiment is formed as a rounded portion 130. The rounded portion 130 constitutes a widened portion which is wider than a remaining portion of the slit 30A. The rounded portion 130 of the slit 30A thus configured prevents stress from concentrating at the end portion of the slit 30A, thereby preventing the slit 30A from extending further.

The slit 30A may be formed in the transparent substrate 30 either before assembling the electrophoretic display device 100, i.e., while the transparent substrate 30 is an independent component before being bonded to the element substrate 2, or after bonding the element substrate 2 and the transparent substrate 30 together thereby forming the electrophoretic display device 100. In either case a sloped surface is formed on the transparent substrate 30, which makes it easier to process the glass substrate 4. Other advantages provided by the slit 30A will be subsequently described.

The electrophoretic element 3 includes an electrophoretic layer 31 and an adhesive layer 33. The electrophoretic layer 31 also includes a plurality of microcapsules 32. The adhesive layer 33 is constituted of an adhesive and serves as a binder. Preferably, the adhesive layer 33 is constituted of an adhesive that is highly compatible with a shell film of the microcapsules 32, and has excellent adhesiveness with the pixel electrodes 25. The electrophoretic element 3 thus configured is bonded to the inner face of the element substrate 2 by means of the adhesive layer 33, as well as to the inner face of the transparent substrate 30, so that the electrophoretic display device 100 is formed.

The electrophoretic element 3 may be formed without the adhesive layer 33. In this case, the microcapsules fixed by a binder are interposed between the pixel electrode 25 and the transparent substrate 30. The binder also serves to bond the microcapsules to the pixel electrode 25 and the transparent substrate 30.

The microcapsules 32 are of a generally spherical shape of substantially the same diameter (30 μm to 100 μm), and contain therein an electrophoretic dispersion. Examples of the material constituting the shell of the microcapsules 32 include a composite film of gum arabic and gelatin, and compounds such as a urethane resin and a urea resin. The electrophoretic dispersion enclosed in the microcapsules 32 is composed of a plurality of electrophoretic particles and a liquid phase dispersion medium for dispersing therein the electrophoretic particles.

Examples of the liquid phase dispersion medium include water, an alcoholic solvent, ester, ketone, aliphatic hydrocarbon, alicyclic hydrocarbon, aromatic hydrocarbon, halogenated hydrocarbon, carboxylate, and various other oils, and mixtures thereof with a surfactant or the like.

The electrophoretic particles may be constituted of organic or inorganic particles (polymer or colloid) that undergo electrophoretic migration in a liquid phase dispersion medium owing to a difference in potential. Specific examples of such a material include one or a combination of black pigments such as carbon black and aniline black, white pigments such as titanium dioxide, monoazo pigments, yellow pigments such as isoindolinone, red pigments such as quinacridone, blue pigments such as phthalocyanine blue, and green pigments such as phthalocyanine green. If necessary, the foregoing pigments may contain as an additive a charge control agent composed of an electrolyte, a surfactant, a metallic soap, a resin, rubber, oil, varnish, or particles of a compound, a dispersant such as a titanium-based coupling agent, an aluminum-based coupling agent, a silane-based coupling agent, a lubricant, a stabilizer, and the like.

The microcapsules 32 each contain two types of electrophoretic particles, for example titanium dioxide which is a white pigment and carbon black which is a black pigment, one of which is negatively charged and the other is positively charged. Naturally other types of electrophoretic particles may be employed, or only one type of electrophoretic particles may be employed so as to cause the particles to electrophoretically migrate toward the common electrode 29 or toward the pixel electrode 25 in order to display an image.

Figure 4:
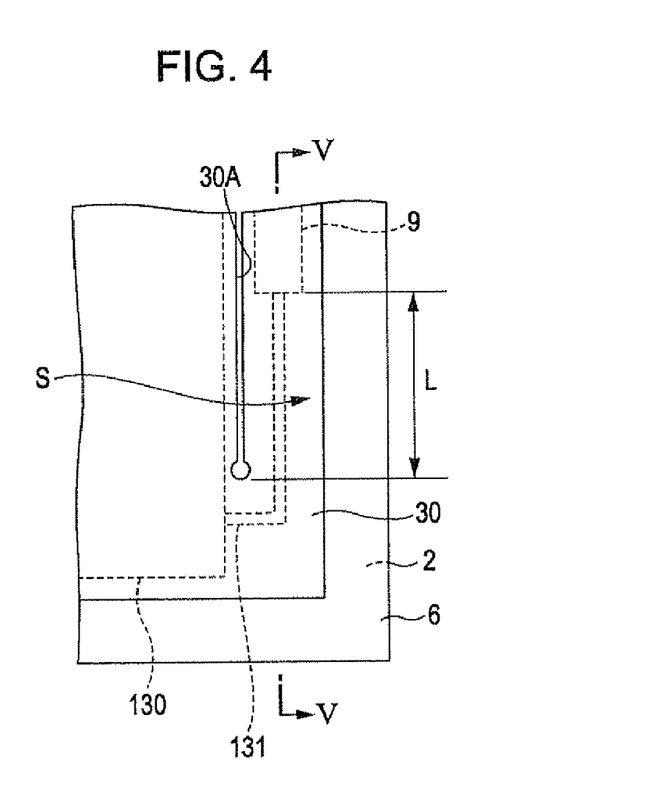
FIG. 4 is an enlarged plan view showing a region around the slit.
Figure 5:
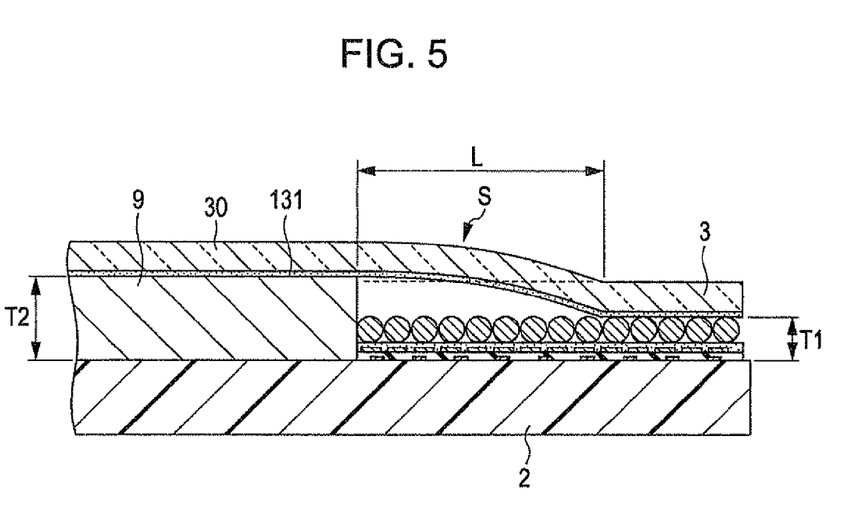
FIG. 5 is a side cross-sectional view taken along a line V-V in FIG. 4.

FIG. 4 is an enlarged plan view showing a region around the slit 30A in the electrophoretic display device 100, and FIG. 5 is a side cross-sectional view taken along a line V-V in FIG. 4. In these drawings, the glass substrate 4 is omitted for the sake of clarity.

The electrophoretic display device 100 includes, as stated above, the vertical conduction member 9 which is sufficiently thick, resulting in increased adhesion between the substrates 2 and 30, and higher reliability in terms of electrical connection. Further, the increased adhesion eliminates the need to form the vertical conduction member 9 over a larger region, thereby enabling the vertical conduction member 9 to be formed so as to have a limited footprint.

The slit 30A formed in the transparent substrate 30 allows a region thereof around the vertical conduction member 9 to independently move with respect to the display region 7 in a thicknesswise direction, to thereby move away therefrom. Such a configuration suppresses formation of a steep shape (rising portion) between the vertical conduction member 9 and the display region 7 due to a difference in thickness between the vertical conduction member 9 and the electrophoretic element 3.

The electrophoretic display device 100 according to this embodiment prevents, therefore, such a drawback that a steep shape formed between the vertical conduction member 9 and the display region 7 imposes a load on the electrophoretic element 3 interposed between the element substrate 2 and the transparent substrate 30, thereby causing separation therebetween. Such a configuration allows the vertical conduction member 9 and the display region 7 to be located close to each other as shown in FIG. 4, despite the difference in thickness between the vertical conduction member 9 and the electrophoretic element 3.

As shown in FIG. 4, the slit 30A extends along a side of the vertical conduction member 9 facing the display region 7, with the respective end portions extending as far as a region outside the vertical conduction member 9, in a longitudinal direction of the slit 30A. Accordingly, the transparent substrate 30 includes a sloped portion S as shown in FIG. 5, formed along a portion of the slit 30A extending farther from the vertical conduction member 9. A length L of the sloped portion S may be determined so that a sufficiently moderate slope can be formed on the basis of a difference in thickness (T2–T1), T2 representing the thickness of the vertical conduction member 9 and T1 representing that of the electrophoretic element 3, as shown in FIG. 5.

In a region of the transparent substrate 30 where the sloped portion S is formed, an interconnect pattern 131 is arranged for electrically connecting the common electrode 29, provided substantially over the entirety of the inner surface 30b of the transparent substrate 30, and the vertical conduction member 9. The sloped portion S thus configured sufficiently mitigates the difference in thickness between the electrophoretic element 3 and the vertical conduction member 9, thereby effectively preventing such a drawback that the interconnect pattern 131 becomes disconnected.

According to this embodiment described above, the slit 30A provided between the display region 7 and the vertical conduction member 9 allows regions of the transparent substrate 30 corresponding to the display region 7 and to the vertical conduction member 9 to be flexibly deformed independently. The independent flexible deformation of the transparent substrate 30 in a vertical direction in the regions corresponding to the display region 7 and to the vertical conduction member 9 suppresses formation of a steep shape between the vertical conduction member 9 and the display region 7 despite a difference in thickness between the vertical conduction member 9 and the electrophoretic element 3. The slit 30A also contributes to reducing a load imposed on a joint portion between the transparent substrate 30 and the vertical conduction member 9 or the electrophoretic element 3, thereby enhancing adhesion between the substrates 2 and 30, so that a mounted structure having high reliability in terms of mechanical and electrical connection can be obtained. Consequently, a highly reliable device can be obtained that can suppress a malfunction arising from the difference in thickness between the electrophoretic element 3 and the vertical conduction member 9, for example separation of the electrophoretic element 3.

Also, the vertical conduction member 9 may be located relatively close to the display region 7. Since the footprint of the vertical conduction member 9 can be made small, a region surrounding the display region 7 can be formed as a narrow frame, and a higher degree of designing freedom can be secured.

Further, since the sloped portion S formed in the transparent substrate 30 sufficiently mitigates the difference in thickness between the electrophoretic element 3 and the vertical conduction member 9, thereby effectively preventing the interconnect pattern 131 from being disconnected.

Although a preferred embodiment of the invention has been described referring to the drawings, it is to be understood that the invention is in no way limited to the embodiment. It is obvious to those skilled in the art that various modifications can be made within the scope and spirit of the invention expressed in the appended claims, and such modifications should be construed as within the scope of the invention.

For example, although the foregoing embodiment exemplifies the case where the vertical conduction member 9 is thicker than the electrophoretic element 3, the invention is also applicable to the case where the vertical conduction member 9 is thinner than the electrophoretic element 3. In the case where the vertical conduction member 9 is thinner than the electrophoretic element 3, a steep shape is formed between the vertical conduction member 9 and the display region 7. Accordingly, a joint portion between the vertical conduction member 9 and the respective substrates 2 and 30 may be subjected to a load, so that the vertical conduction member 9 may be separated from the substrates, resulting in failure in electrical conduction.

In this case also, forming the slit 30A in the transparent substrate 30 at a position between the vertical conduction member 9 and the display region 7 allows a region of the transparent substrate 30 around the vertical conduction member 9 to independently move with respect to the display region 7 in a thicknesswise direction, to thereby move away therefrom. Such a configuration suppresses formation of a steep shape (rising portion) between the vertical conduction member 9 and the display region 7 due to a difference in thickness between the vertical conduction member 9 and the electrophoretic element 3.

Thus, although the vertical conduction member 9 is thinner than the electrophoretic element 3, the slit 30A equally contributes to reducing a load imposed on a joint portion between the vertical conduction member 9 and the respective substrates 2 and 30, thereby securing high reliability in terms of electrical connection.

Electronic Device

Now, examples of an electronic device including the electro-optical device according to the foregoing embodiment (electrophoretic display device 100) will be described.

Figure 6:
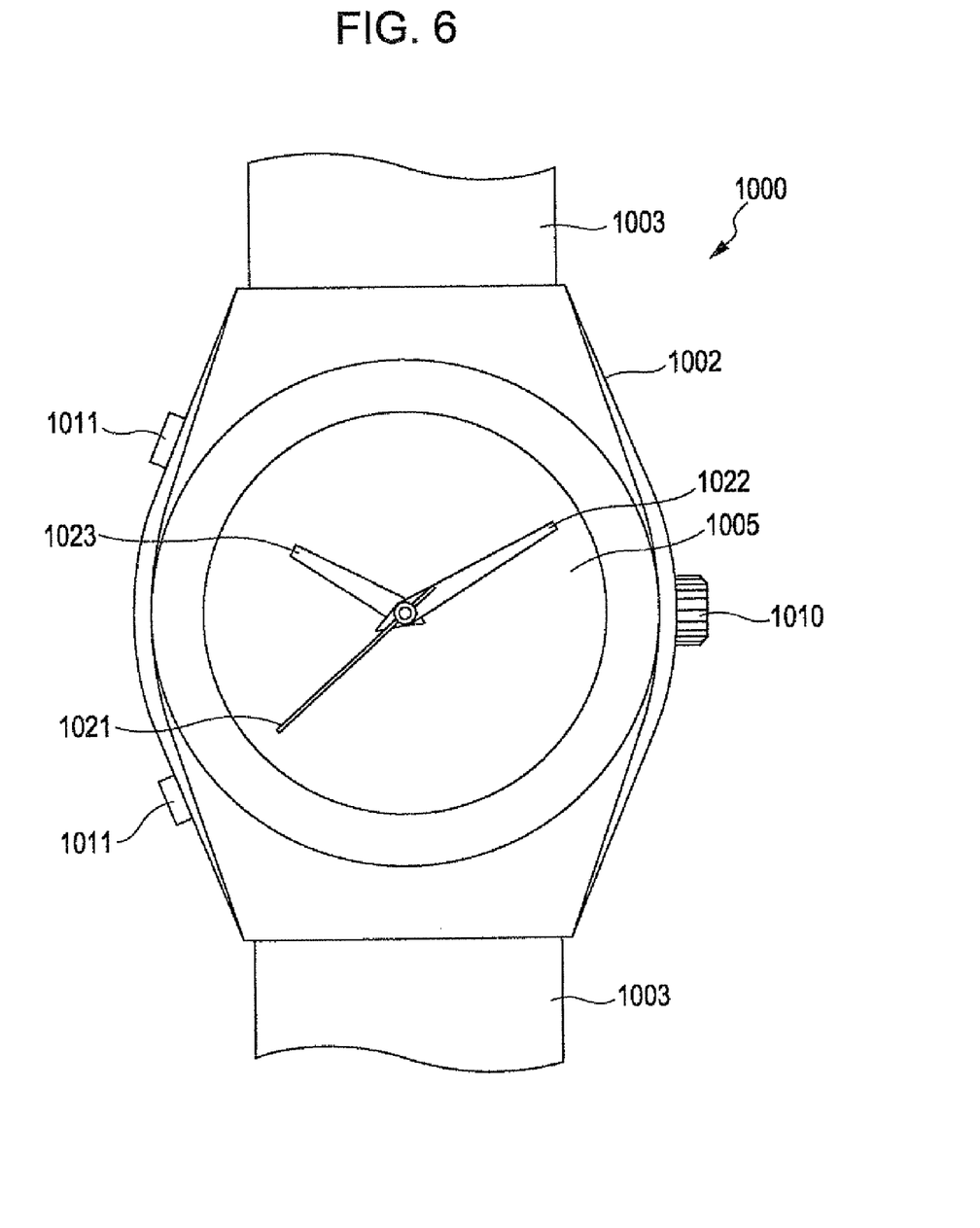
FIG. 6 is a front view showing an example of electronic devices.

FIG. 6 is a front view showing a wrist watch 1000. The wrist watch 1000 includes a watch case 1002 and a pair of straps 1003 each connected to the watch case 1002.

A display screen 1005 constituted of the electro-optical device according to the foregoing embodiment, a second hand 1021, a minute hand 1022, and an hour hand 1023 are provided on a front face of the watch case 1002. A stem 1010 and an operating button 1011 serving as an operating element are provided on a side face of the watch case 1002. The stem 1010 is connected to a winding stem (not shown) located inside the watch case 1002, so as to be pushed and pulled in a plurality of steps (for example in two steps) and rotated, interlocked with the winding stem. The display screen 1005 can display an image serving as a background, characters indicating dates and times, a second hand, a minute hand, or an hour hand.

Figure 7:
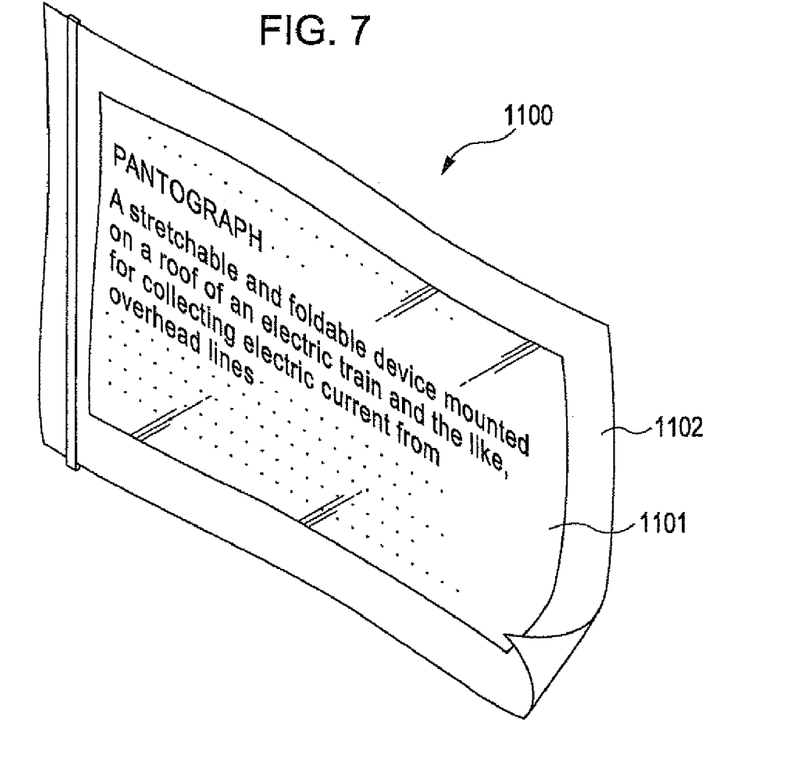
FIG. 7 is a perspective view showing another example of electronic devices.

FIG. 7 is a perspective view showing an electronic paper 1100. The electronic paper 1100 includes the electro-optical device according to the foregoing embodiment in a display region 1101. The electronic paper 1100 includes a main body 1102 constituted of a rewritable sheet that is soft and flexible and having a texture similar to that of existing paper. In the electronic paper 1100, the element substrate 2 included in the electrophoretic display device 100 is also constituted of a flexible material.

Figure 8:
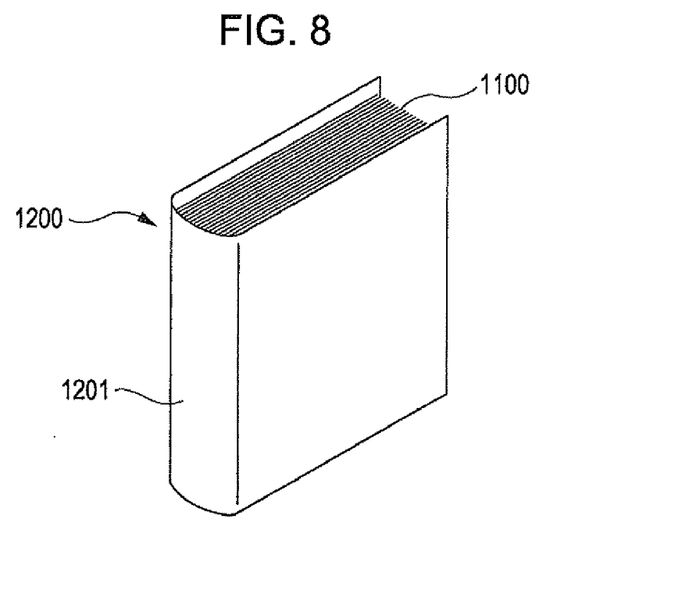
FIG. 8 is a perspective view showing still another example of electronic devices.

FIG. 8 is a perspective view showing an electronic notebook 1200. The electronic notebook 1200 includes a plurality of sheets of the electronic paper 1100, bundled together and held by a cover 1201. The cover 1201 includes a display data input unit (not shown) for inputting, for example, display data transmitted from an external device. Accordingly, a display content can be modified or updated in accordance with the display data, with the electronic papers bundled together.

The wrist watch 1000, the electronic paper 1100, and the electronic notebook 1200, with the electrophoretic display device 100 according to the invention incorporated therein, can provide a narrow-framed display screen that is highly reliable in terms of mechanical and electrical connection, and can therefore constitute an electronic device that offers excellent performance and reliability.

Naturally, the foregoing electronic devices are merely exemplary of the electronic device according to the invention, and in no way limit the technical scope of the invention. The electro-optical device according to the invention can be suitably applied to a display screen of various other electronic devices, such as a mobile phone and a portable audio apparatus.

What is claimed is:

1. An electrophoretic display device that includes a display region including an electrophoretic element interposed between a first substrate and a second substrate that is flexible, comprising:

a conductive member that is located between the first substrate and the second substrate and at a position outside the display region, and that electrically connects the substrates, the conductive member having a different thickness from that of the electrophoretic element;

wherein the second substrate includes a slit formed at a position between the display region and the conductive member.

2. The electrophoretic display device according to claim 1, wherein the conductive member is thicker than the electrophoretic element.

3. The electrophoretic display device according to claim 1, wherein the first substrate is also flexible.

4. The electrophoretic display device according to claim 1, wherein the slit is formed with both ends thereof closed in the second substrate.

5. The electrophoretic display device according to claim 1, wherein the slit includes a widened portion which is wider than the remaining portion of the slit, at least at an end portion of the slit.

6. The electrophoretic display device according to claim 1, wherein the slit extends along a side of the conductive member facing the display region.

7. The electrophoretic display device according to claim 6, wherein at least an end portion of the slit extends as far as a region outside the conductive member, in a longitudinal direction of the slit.

8. An electronic device comprising the electrophoretic display device according to claim 1.

9. An electronic device comprising the electrophoretic display device according to claim 2.

10. An electronic device comprising the electrophoretic display device according to claim 3.

11. An electronic device comprising the electrophoretic display device according to claim 4.

12. An electronic device comprising the electrophoretic display device according to claim 5.

13. An electronic device comprising the electrophoretic display device according to claim 6.

14. An electronic device comprising the electrophoretic display device according to claim 7.

* * * * *